(12) United States Patent
Yagi et al.

(10) Patent No.: US 8,981,006 B2
(45) Date of Patent: Mar. 17, 2015

(54) METHOD FOR MANUFACTURING RUBBER COMPOSITION, RUBBER COMPOSITION, AND TIRE USING SAME

(75) Inventors: Reiko Yagi, Kodaira (JP); Kumi Fujiki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/819,510

(22) PCT Filed: Aug. 19, 2011

(86) PCT No.: PCT/JP2011/068808
§ 371 (c)(1),
(2), (4) Date: Feb. 27, 2013

(87) PCT Pub. No.: WO2012/026409
PCT Pub. Date: Mar. 1, 2012

(65) Prior Publication Data
US 2013/0158163 A1    Jun. 20, 2013

(30) Foreign Application Priority Data

Aug. 27, 2010   (JP) ................................. 2010-191141

(51) Int. Cl.
| C08F 8/00 | (2006.01) |
| C09B 67/00 | (2006.01) |
| B29D 30/52 | (2006.01) |
| C08J 3/22 | (2006.01) |
| B60C 1/00 | (2006.01) |
| C08L 21/00 | (2006.01) |
| C08J 3/20 | (2006.01) |

(52) U.S. Cl.
CPC ... *C08J 3/22* (2013.01); *B60C 1/00* (2013.01); *C08L 21/00* (2013.01); *C08J 3/203* (2013.01); *C08J 2300/22* (2013.01); *C08J 2300/26* (2013.01); *C08J 2321/00* (2013.01)
USPC ........... 525/133; 525/137; 525/139; 525/197; 524/502; 524/508; 524/511

(58) Field of Classification Search
USPC ................. 525/137, 139, 141, 196, 197, 133; 524/502, 508, 511
See application file for complete search history.

(56) References Cited

U.S. PATENT DOCUMENTS

| 3,637,544 | A | * | 1/1972 | Lundberg ....................... 525/186 |
| 3,658,752 | A | * | 4/1972 | Das ............................... 524/496 |
| 4,421,891 | A | | 12/1983 | Miyake et al. |
| 4,699,832 | A | * | 10/1987 | Sattelmeyer .................. 428/36.8 |
| 5,378,754 | A | * | 1/1995 | Bauer et al. ................... 524/514 |
| 6,037,418 | A | | 3/2000 | Mukai et al. |
| 2006/0069191 | A1 | | 3/2006 | Durairaj et al. |
| 2011/0172339 | A1 | | 7/2011 | Satou |
| 2013/0158163 | A1 | * | 6/2013 | Yagi et al. ..................... 523/351 |

FOREIGN PATENT DOCUMENTS

| CN | 101023111 A | 8/2007 |
| JP | 55-54337 A | 4/1980 |
| JP | 5-98081 A | 4/1993 |
| JP | 6-9826 A | 1/1994 |
| JP | 7-173202 A | 7/1995 |
| JP | 9-272307 A | 10/1997 |
| JP | 10-265616 A | 10/1998 |
| JP | 2001-226528 A | 8/2001 |
| JP | 2002-205345 A | 7/2002 |
| JP | 2003-41056 A | 2/2003 |
| JP | 2003-41057 A | 2/2003 |
| JP | 2004-238547 A | 8/2004 |
| JP | 2006-117927 A | 5/2006 |
| JP | 2008-156419 A | 7/2008 |
| JP | 2010-254782 A | 11/2010 |
| JP | 2011-52145 A | 3/2011 |
| WO | 2010/021316 A1 | 2/2010 |
| WO | 2010/113973 A1 | 10/2010 |

OTHER PUBLICATIONS

International Search Report for PCT/JP2011/068808 dated Dec. 6, 2011.

* cited by examiner

*Primary Examiner* — Nathan M Nutter
(74) *Attorney, Agent, or Firm* — Sughrue Mion, PLLC

(57) ABSTRACT

The present invention is a method for manufacturing a rubber composition containing a rubber component, a resin, a reinforcing filler and a crosslinking agent, and the method contains: a first step of adding the resin to the rubber component to produce a master batch; a second step of kneading the master batch with the reinforcing filler to produce a filled master batch; and a third step of kneading the filled master batch with the crosslinking agent, thereby providing a rubber composition having higher elasticity and large breaking elongation.

11 Claims, No Drawings

METHOD FOR MANUFACTURING RUBBER COMPOSITION, RUBBER COMPOSITION, AND TIRE USING SAME

CROSS REFERENCE TO RELATED APPLICATIONS

This application is a National Stage of International Application No. PCT/JP2011/068808 filed Aug. 19, 2011, claiming priority based on Japanese Patent Application No. 2010-191141 filed Aug. 27, 2010, the contents of all of which are incorporated herein by reference in their entirety.

TECHNICAL FIELD

The present invention relates to a method for manufacturing a rubber composition, a rubber composition, and a tire using the same, and more specifically relates to a method for manufacturing a rubber composition achieving improvement of characteristics of the rubber composition, a rubber composition, and a tire using the same.

BACKGROUND ART

Highly elastic rubber has been used as a rubber composition used in a carcass member, a stiffener (bead filler) and the like of a tire. As a method of making rubber highly elastic, a method of increasing an amount of a filler, such as carbon black (see, for example, Patent Document 1), a method of increasing crosslinking point by increasing an amount of sulfur of a vulcanizing agent, and the like have been known. However, the method of increasing an amount of a filler, such as carbon black, has problems that the rubber composition may be deteriorated in factory workability and breakage resistance, such as breaking elongation, and the rubber composition may be deteriorated in exothermic characteristics. The method of increasing an amount of sulfur of a vulcanizing agent has problems that the breaking elongation may be deteriorated, and the property change due to thermal degradation may be increased.

In view of the problems, a method of enhancing the elasticity of a rubber composition while suppressing the breaking elongation thereof from being lowered. Examples of the method include a method of adding, to a rubber composition, a non-modified novolak type phenol resin, which is obtained through condensation reaction of a phenolic compound and an aldehyde compound in the presence of an acidic catalyst, and a curing agent. Examples thereof also include a method of adding, to a rubber composition, a modified novolak type phenol resin, which is obtained by modifying a novolak type phenol resin with an unsaturated oil, such as tall oil and cashew oil, or an aromatic hydrocarbon, such as xylene and mesitylene, and a curing agent. The curing agent used may be hexamethylenetetramine (see, for example, Patent Documents 2 and 3).

As a method of enhancing a breaking elongation of a rubber composition while enhancing hardness thereof, such a method for manufacturing a rubber composition has been proposed that contains a step of preparing a wet master batch by dissolving diene rubber in a solvent, and adding a phenol resin and carbon black thereto, followed by agitating (see, for example, Patent Document 4).

However, these methods are still insufficient for enhancing the elasticity of the rubber composition while suppressing the breaking elongation thereof from being lowered.

RELATED ART DOCUMENTS

Patent Documents

Patent Document 1: JP-A-9-272307
Patent Document 2: JP-A-5-98081
Patent Document 3: JP-A-2001-226528
Patent Document 4: JP-A-2008-156419

SUMMARY OF THE INVENTION

Problems to be Solved by the Invention

The present invention has been made under the circumstances, and an object thereof is to provide a method for manufacturing a rubber composition that is capable of providing a rubber composition having characteristics including higher elasticity and large breaking elongation, the rubber composition, and a tire using the same.

Means for Solving the Problems

The problems may be solved by the present invention (1) to (13) below.

(1) A method for manufacturing a rubber composition containing a rubber component, a resin, a reinforcing filler and a crosslinking agent,
the method containing: a first step of adding the resin to the rubber component to produce a master batch; a second step of kneading the master batch with the reinforcing filler to produce a filled master batch; and a third step of kneading the filled master batch with the crosslinking agent.

(2) The method for manufacturing a rubber composition according to the item (1), wherein the first step is a step of producing a dry master batch.

(3) The method for manufacturing a rubber composition according to the item (1) or (2), wherein the resin is a thermosetting resin.

(4) The method for manufacturing a rubber composition according to the item (3), wherein the thermosetting resin is a phenolic thermosetting resin.

(5) The method for manufacturing a rubber composition according to the item (4), wherein the phenolic thermosetting resin is at least one selected from a novolak type phenol resin, a novolak type cresol resin, a novolak type xylenol resin, a novolak type resorcinol resin, resins formed by modifying these resins with an oil, and a resin composition containing a novolak type resorcin resin and a resole type phenol resin.

(6) The method for manufacturing a rubber composition according to the item (4) or (5), wherein the phenolic thermosetting resin contains a methylene donor in an amount of from 0.1 to 80% by mass based on the total amount of the phenolic thermosetting resin.

(7) The method for manufacturing a rubber composition according to the item (5), wherein the novolak type resorcin resin is obtained by reacting resorcin and an aldehyde compound at a molar ratio (aldehyde compound/resorcin) of from 0.4 to 0.8.

(8) The method for manufacturing a rubber composition according to the item (5), wherein the resole type phenol resin has a dimethylene ether group amount of from 20 to 80% by mol based on a total linking group amount derived from an aldehyde compound that links aromatic rings derived from a phenolic compound.

(9) The method for manufacturing a rubber composition according to the item (5), wherein the oil used for modifying the resin is at least one oil selected from rosin oil, tall oil, cashew oil, linoleic acid, oleic acid and linolenic acid.

(10) The method for manufacturing a rubber composition according to any one of the items (1) to (9), wherein an amount of the resin mixed is from 2 to 50 parts by mass per 100 parts by mass of the rubber component.

(11) The method for manufacturing a rubber composition according to any one of the items (1) to (10), wherein an amount of reinforcing filler mixed is from 5 to 200 parts by mass per 100 parts by mass of the rubber component.

(12) A rubber composition produced by the method for manufacturing a rubber composition according to any one of the items (1) to (11).

(13) A tire produced using the rubber composition according to the item (12).

Advantages of the Invention

According to the present invention, a method for manufacturing a rubber composition that is capable of providing a rubber composition having characteristics including higher elasticity and large breaking elongation, the rubber composition, and a tire using the same are provided.

EMBODIMENTS FOR CARRYING OUT THE INVENTION

Embodiments of the present invention will be described below.

Method for Manufacturing Rubber Composition, and Rubber Composition

The method for manufacturing a rubber composition according to the embodiment is a method for manufacturing a rubber composition containing a rubber component, a resin, a reinforcing filler and a crosslinking agent, and contains: a first step of adding the resin to the rubber component to produce a master batch; a second step of kneading the master batch with the reinforcing filler to produce a filled master batch; and a third step of kneading the filled master batch with the crosslinking agent.

In the embodiment, the master batch is produced with the resin and the rubber component, and then the reinforcing filler and the crosslinking agent are sequentially kneaded therewith, thereby enhancing the dispersibility of the resin in the resulting rubber composition. Furthermore, the reinforcing filler is added to the state where the resin is sufficiently dispersed in the rubber component, and thereby the most surface of the reinforcing filler may be prevented from being covered with the resin, whereby the reinforcing reaction of the reinforcing filler and the polymer in the rubber component may be prevented from being inhibited. Accordingly, a rubber composition that realizes high elasticity while maintaining the breaking characteristics may be provided, as compared to the ordinary methods.

Rubber Component

Examples of the rubber component that can be used in the method for manufacturing a rubber composition of the embodiment include at least one selected from natural rubber (NR) and various kinds of synthetic rubber. Specific examples of the synthetic rubber include polyisoprene rubber (IR), styrene-butadiene copolymer rubber (SBR), polybutadiene rubber (BR), butyl rubber (IIR), halogenated butyl rubber (e.g., Br-IIR and Cl-IIR), ethylene-propylene-diene rubber (EPDM), crosslinked polyethylene rubber, chloroprene rubber and nitrile rubber. The rubber components may be used solely or as a mixture of two or more kinds thereof. The advantages peculiar to the embodiment, i.e., high elasticity and large breaking elongation, may be obtained with any of the rubber components through curing the thermosetting resin, and the like processes, described later.

Among these, diene rubber, such as natural rubber (NR), styrene-butadiene copolymer rubber (SBR) and polybutadiene rubber (BR), is preferably used since a rubber composition having characteristics including higher elasticity and large breaking elongation may be obtained.

Resin

The rubber composition of the embodiment contains a resin. The resin is not particularly limited, and a thermosetting resin is preferably used. Examples of the thermoplastic resin include a melamine resin (melamine-formaldehyde resin), a urea resin (urea-formaldehyde resin), a polycarbonate resin, a phenolic thermosetting resin, an epoxy resin, an unsaturated polyester resin, an acrylic resin, a guanamine resin and a polyurethane resin. Other than these resins, a resin having hardness that is equivalent to these resins may also be used.

Among these resins, a phenolic thermosetting resin is preferably used as the thermosetting resin in the embodiment. The phenolic thermosetting resin in the embodiment means a phenol resin that is cured through application of heat. The phenol resin herein means a wide variation of phenol resins that include not only polycondensation products formed only of phenol as a raw material, but also polycondensation products formed of a phenolic compound, such as cresol and xylenol.

The phenolic thermosetting resin used in the embodiment is used for enhancing the elasticity of the rubber while suppressing the breaking resistance of the rubber from being lowered. The phenolic thermosetting resin used is preferably at least one selected from a novolak type phenol resin, a novolak type cresol resin, a novolak type xylenol resin, a novolak type resorcinol resin, and resins formed by modifying these resins with an oil.

The oil used for modifying the resin is preferably at least one oil selected from rosin oil, tall oil, cashew oil, linoleic acid, oleic acid and linolenic acid.

It is necessary to add a curing agent to the phenolic thermosetting resin. Examples of the curing agent include a methylene donor. Examples of the methylene donor include at least one selected from a polyvalent methylol melamine derivative, such as hexamethylenetetramine and hexamethoxymethylmelamine; an oxazolidine derivative; polyvalent methylolated acetyleneurea; acetaldehyde ammonia; α-polyoxymethylene and paraformaldehyde.

Among these, the use of hexamethylenetetramine or hexamethoxymethylmelamine is preferred since a rubber composition having higher elasticity is obtained with a large curing rate.

The content of the methylene donor is preferably from 0.1 to 80% by mass based on the total amount of the phenolic thermosetting resin. When the content of the methylene donor is in the range, the phenolic thermosetting resin may be sufficiently cured while preventing the crosslinking system of the rubber from being adversely affected.

The content is more preferably from 5 to 70% by mass, and further preferably from 10 to 60% by mass.

Examples of the phenolic thermosetting resin used in the embodiment include a resin composition containing a novolak type resorcin resin and a resole type phenol resin.

The novolak type resorcin resin does not have a methylol group at the end thereof, and therefore a resin composition containing the novolak type resorcin resin solely cannot be cured without a curing agent. The resol type phenol resin has a methylol group at the end thereof, and therefore a resin composition containing the resol type phenol resin solely can be cured without a curing agent. However, a resin composition containing the resol type phenol resin solely has a low curing rate and is difficult to be cured sufficiently in a vulcanization process of rubber. Accordingly, both the novolak type resorcin resin and the resole type phenol resin are used to form a resin composition, which can be cured sufficiently without a curing agent in a vulcanization process of rubber. Furthermore, the elastic modulus of the rubber composition can be increased, and a sufficient breaking elongation can be imparted thereto.

For the resole type phenol resin used in the embodiment, a phenolic compound and an aldehyde compound are reacted to provide a precursor before curing. An alkali catalyst is added to the reaction system to conduct addition reaction mainly, thereby providing a resole type phenol resin having a low polymerization degree.

Examples of the phenolic compound used in the resole type phenol resin in the embodiment include a cresol compound, such as o-cresol, m-cresol and p-cresol; a xylenol compound, such as 2,3-xylenol, 2,4-xylenol, 2,5-xylenol, 2,6-xylenol, 3,4-xylenol and 3,5-xylenol; an ethylphenolic compound, such as o-ethylphenol, m-ethylpheol and p-ethylphenol; a butylphenolic compound, such as isopropylphenol, butylphenol and p-tert-butylphenol; an alkylphenolic compound, such as p-tert-amylphenol, p-octylphenol, p-nonylphenol and p-cumylphenol; a halogenated phenolic compound, such as fluorophenol, chlorophenol, bromophenol and iodophenol; a substituted monohydric phenolic compound, such as p-phenylphenol, aminophenol, nitrophenol, dinitrophenol and trinitrophenol; a monohydric phenolic compound, such as 1-naphthol and 2-naphthol; and a polyhydric phenolic compound, such as resorcin, alkylresorcin, pyrogallol, catechol, alkylcatechol, hydroquinone, alkylhydroquinone, phloroglucin, bisphenol A, bisphenol F, bisphenol S and dihydroxynaphthalene. These compounds may be used solely or as a mixture of two or more kinds thereof.

Among these phenolic compounds, ones selected from phenol, a cresol compound and bisphenol A, which are economically advantageous, are preferred.

Examples of the aldehyde compound used in the resole type phenol resin and novolak type resorcin resin in the embodiment include formaldehyde, paraformaldehyde, trioxane, acetaldehyde, propionaldehyde, polyoxymethylene, chloral, hexamethylenetetramine, furtural, glyoxal, n-butylaldehyde, caproaldehyde, allylaldehyde, benzaldehyde, crotonaldehyde, acrolein, tetraoxymethylene, phenylacetaldehyde, o-tolualdehyde and salicylaldehyde. These compounds may be used solely or as a mixture of two or more kinds thereof.

Among these aldehyde compounds, ones selected from formaldehyde and paraformaldehyde, which are excellent in reactivity and inexpensive, are preferred.

The resole type phenol resin may be synthesized by reacting the phenolic compound and the aldehyde compound in the presence of a catalyst, such as an alkali metal, an amine compound and a divalent metal salt.

Examples of the catalyst used in the reaction include a hydroxide of an alkali metal, such as sodium hydroxide, lithium hydroxide and potassium hydroxide; an oxide or a hydroxide of an alkaline earth metal, such as calcium, magnesium and barium; sodium carbonate; aqueous ammonia; an amine compound, such as triethylamine and hexamethylenetetramine; a divalent metal salt, such as magnesium acetate and zinc acetate, which may be used solely or as a combination of two or more kinds thereof.

In the synthesis of the resole type phenol resin, the reaction molar ratio of the phenolic compound and the aldehyde compound is preferably from 0.80 to 2.50 mol, and more preferably from 1.00 to 2.30 mol, of the aldehyde compound, per 1 mol of the phenolic compound. When the molar ratio is in the range, the reaction may be easily controlled to assure production of the resole type phenol resin.

The resole type phenol resin used in the embodiment preferably has a dimethylene ether group amount of from 20 to 80% by mol, and more preferably from 25 to 75% by mol, based on the total linking group amount derived from the aldehyde compound that links the aromatic rings derived from the phenolic compound. When the dimethylene ether group amount is in the range, the resulting phenol resin composition has good curing property and excellent thermal stability without fluctuation in quality.

The ratio of the linking groups in the resole type phenol resin is measured according to a $^1$H-NMR method. Specifically, the resole type phenol resin is treated with acetic anhydride in a pyridine catalyst to acetylate the methylol group thereof, and the resulting acetylated product is measured for $^1$H-NMR.

The linking group amounts are obtained from the integrated intensity ratios of the peaks of the methylene group (ca. 3.8 ppm), the dimethylene ether group (ca. 4.5 ppm) and the methylol group (ca. 5.0 ppm) based on the peak of acetone (2.04 ppm) in the measured spectrum with a factor of ½ time for the methylene group and the methylol group and ¼ time for the dimethylene ether group, from which the ratio of the dimethylene ether group amount (% by mol) based on the total linking group amount derived from the aldehyde compound (i.e., the sum of the methylene group amount, the dimethylene ether group amount and the methylol group amount).

An NMR measuring equipment (frequency: 300 MHz), JNM-AL300, produced by JEOL, Ltd., is used. The aforementioned measuring method may be applied not only to the case where phenol and formaldehyde are used as the raw material of the resole type phenol resin, but also to the cases where other phenolic compounds and aldehyde compounds are used.

Examples of the resorcin compound used in the novolak type resorcin resin include resorcin; a methylresorcin compound, such as 2-methylresorcin, 5-methylresorcin and 2,5-dimethylresorcin; 4-ethylresorcin; 4-chlororesorcin; 2-nitroresorcin; 4-bromoresorcin; and 4-n-hexylresocin. These compounds may be used solely or as a mixture of two or more kinds thereof.

Among these resorcin compounds, resorcin and a methylresorcin compound, which are economically advantageous, are preferred.

The novolak type resorcin resin may be synthesized by reacting resorcin and the aldehyde compound in the presence of an acidic catalyst, and removing water therefrom by a dehydration process. Examples of the catalyst used in the synthesis of the novolak type resorcin resin include an acid compound, such as oxalic acid, hydrochloric acid, sulfuric acid, diethyl sulfate and p-toluenesulfonic acid, which may be used solely or as a combination of two or more kinds thereof. The resin may be synthesized without the use of a catalyst since resorcin exhibits acidity by itself.

In the synthesis of the novolak type resorcin resin, the reaction molar ratio of resorcin and the aldehyde compound is preferably from 0.40 to 0.80 mol of the aldehyde compound, and more preferably from 0.45 to 0.75 mol of the aldehyde compound, per 1 mol of resorcin. When the molar ratio is in the range, the control of the reaction and the handleability of the resin may be facilitated.

The content of the novolak type resorcin resin in the resin composition is preferably from 18 to 50% by mass, and more preferably from 20 to 45% by mass, based on the total resin composition.

When the content of the novolak type resorcin resin is in the range, the curing property of the resin component in the embodiment may be enhanced, thereby providing a rubber composition having high elasticity and low exothermic property.

The resin composition in the embodiment may contain a filler for preventing the resin composition itself from undergoing blocking, for example, in the case where the resin composition is stored after winding. Various materials may be used as the filler, and examples thereof include calcium carbonate, calcium stearate, silica, barium sulfate, talc, clay and graphite, which may be used solely or as a combination of two or more kinds thereof. Among these, silica is preferably used, and dry silica is particularly preferably used since it provides fewer disadvantages in the rubber composition.

The amount of the filler added is preferably from 1 to 40 parts by mass per 100 parts by mass of the resin composition. The use of the filler improves the blocking property of the resin composition itself without impairing the elastic modulus and the breaking elongation of the rubber composition.

The method of mixing the resole type phenol resin and the novolak type resorcin resin for providing the resin composition in the embodiment is not particularly limited as far as the components are uniformly mixed and dispersed. Examples of the method include a method of adding and mixing the novolak type phenol resin to the resole type phenol resin in the course of the reaction thereof, a method of adding and mixing the resole type phenol resin to the novolak type phenol resin in the course of the reaction thereof, a method of simply pulverizing and mixing the resole type phenol resin and the novolak type phenol resin, and a method of kneading them with a twin screw extruder, an open roll, a pressure kneader or the like.

In the embodiment, at least one selected from the phenolic thermosetting resins having been described above is preferably used. In other words, the phenolic thermosetting resins may be used solely or as a combination of two or more kinds thereof.

The amount of the resin mixed in the rubber composition of the embodiment is preferably from 2 to 50 parts by mass per 100 parts by mass of the rubber component. When the amount is in the range, a rubber composition having high elasticity may be obtained without impairing the flexibility of the rubber composition.

The amount of the resin mixed is more preferably from 3 to 45 parts by mass, further preferably from 5 to 40 parts by mass, and particularly preferably from 10 to 30 parts by mass.

Reinforcing Filler

The reinforcing filler mixed in the rubber composition of the embodiment may be appropriately selected from reinforcing fillers that have been used in ordinary rubber compositions. Specific examples thereof include carbon black, silica and an inorganic compound represented by the following general formula (I):

$$nM.xSiO_y.zH_2O \quad (I)$$

wherein M represents at least one selected from a metal selected from the group consisting of aluminum, magnesium, titanium, calcium and zirconium, oxides and hydroxides of these metals, hydrates thereof, and carbonate salts of these metals; and n, x, y, and z represent an integer of from 1 to 5, an integer of from 0 to 10, an integer of from 2 to 5, and an integer of from 0 to 10.

The reinforcing filler may be used solely or as a mixture of two or more kinds thereof.

The carbon black may be ones that have been ordinarily used in the rubber industry. Examples thereof include various grades of carbon black, such as SAF, HAF, ISAF, FEF, SRF and GPF, which may be used solely or as a mixture thereof.

The silica is not particularly limited and is preferably wet silica, dry silica or colloidal silica. These materials may be used solely or as a mixture thereof.

Examples of the inorganic compound represented by the general formula (I) include alumina ($Al_2O_3$), such as α-alumina, boehmite, alumina monohydrate ($Al_2O_3.H_2O$), such as diaspore, aluminum hydroxide ($Al(OH)_3$), such as gibbsite and bayerite, aluminum carbonate ($Al_2(CO_3)_2$), magnesium hydroxide ($Mg(OH)_2$) magnesium oxide (MgO), magnesium carbonate ($MgCO_3$), talc ($3MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide ($Ca(OH)_2$), aluminum magnesium oxide ($MgO.Al_2O_3$), clay ($Al_2O_3.2SiO_2$), kaolin ($Al_2O_3.2SiO_2.2H_2O$) pyrophyllite ($Al_2O_3.4SiO_2.2H_2O$), bentonite ($Al_2O_3.4SiO_2.2H_2O$) aluminum silicate (such as $Al_2SiO_5$ and $Al_4.3SiO_4.5H_2O$), magnesium silicate (such as $Mg_2SiO_4$ and $MgSiO_3$), calcium silicate (such as $Ca_2.SiO_4$), aluminum calcium silicate (such as $Al_2O_3.CaO.2SiO_2$), magnesium calcium silicate ($CaMgSiO_4$), calcium carbonate ($CaCO_3$), zirconium oxide ($ZrO_2$), zirconium hydroxide ($ZrO(OH_2).nH_2O$), zirconium carbonate ($Zr(CO_3)_2$), and a crystalline aluminosilicate containing hydrogen, an alkali metal or an alkaline earth metal for compensating the charge, such as various kinds of zeolite.

The inorganic compound represented by the general formula (I) is preferably a compound wherein M is at least one selected from aluminum metal, aluminum oxide, aluminum hydroxide, aluminum hydrate and aluminum carbonate.

The reinforcing filler is preferably carbon black, silica or aluminum hydroxide.

The amount of the reinforcing filler mixed is preferably from 5 to 200 parts by mass per 100 parts by mass of the rubber component. When the amount is in the range, sufficient reinforcing effect may be obtained even with the thermosetting resin contained in the rubber composition, the exothermic property may be prevented from being deteriorated, and the properties, such as the wear resistance and the processability, may be maintained.

The amount of the reinforcing filler mixed is more preferably from 10 to 180 parts by mass, and further preferably from 20 to 150 parts by mass.

Crosslinking Agent

The crosslinking agent in the embodiment conceptually includes a vulcanizing agent and a vulcanization accelerator. Examples of the vulcanizing agent include sulfur and a sulfur-containing compound. The amount of the vulcanizing agent mixed may be such a range that is ordinarily applied to a rubber composition, and, for example, is preferably from 0.1 to 10 parts by mass, and more preferably from 1 to 5 parts by mass, in terms of sulfur content per 100 parts by mass of the rubber component.

Examples of the vulcanization accelerator include 1,3-diphenylguanidine, dibenzothiazyldisulfide, N-t-butyl-2-benzothiazylsulfenamide, N-cyclohexyl-2-benzothiazolyl-sulfenamide, N,N'-dicyclohexyl-2-benzothiazolylsulfenamide and 2-mercaptobenzothiazole. The amount of the vulcanization accelerator mixed may also be such a range that is ordinarily applied to a rubber composition, and, for example, is preferably from 0.1 to 7 parts by mass, and more preferably from 1 to 5 parts by mass, per 100 parts by mass of the rubber component.

Additional Components

In the method for manufacturing a rubber composition of the embodiment, various mixing agents that have been ordinarily used in the rubber industry, such as a process oil, an antiaging agent, a softener, zinc oxide, stearic acid, an ozone deterioration preventing agent, a colorant, an antistatic agent, a lubricant, an antioxidant, a coupling agent, a foaming agent and a foaming assistant, may be appropriately mixed in such ranges that do not impair the advantages of the present invention. These mixing agents used are preferably commercially available products.

Examples of the process oil include a paraffin series, a naphthene series and an aromatic series. The amount thereof is preferably from 0 to 100 parts by mass per 100 parts by mass of the rubber component. When the amount exceeds 100 parts by mass, there is a tendency that the vulcanized rubber may be deteriorated in tensile strength and low exothermic property.

Examples of the antiaging agent include 3C (N-isopropyl-N'-phenyl-p-phenylenediamine), 6C (N-(1,3-dimethylbutyl)-N'-phenyl-p-phenylenediamine), AW (6-ethoxy-2,2,4-trimethyl-1,2-dihydroquinoline), and a high temperature condensed product of diphenylamine and acetone. The amount thereof is preferably from 0.1 to 6.0 parts by mass, and more preferably from 0.3 to 5.0 parts by mass, per 100 parts by mass of the rubber component.

Production of Rubber Composition

The method for manufacturing a rubber composition of the embodiment contains the first step, the second step and the third step.

First Step

In this step, the resin is added to the rubber component to produce a master batch. In the embodiment, for enhancing the dispersibility of the resin in the rubber composition and for preventing the resin from covering the surface of the reinforcing filler as much as possible, a compounded material of the rubber component and the resin (which is hereinafter referred to as a master batch) is produced before mixing the reinforcing filler.

The method for producing the master batch containing the rubber component and the resin is not particularly limited, and the master batch may be produced by a wet master batch method or a dry master batch method. The wet master batch herein is a master batch that is formed by mixing the raw material components in a liquid state with a solvent or the like, and the dry master batch herein is a master batch that is formed by mixing mechanically the raw material components in a solid state. The dry master batch is preferred since a post-treatment, such as drying, may not be necessary, and the subsequent process may be performed continuously.

Examples of the production method of the master batch in the embodiment are shown below.

Dry Master Batch

A dry master batch containing the rubber component and the resin is generally obtained by kneading natural rubber or synthetic rubber in a bulk form and the thermosetting resin, such as the phenolic thermosetting resin (rubber-resin production step). Representative examples of the kneader (first kneader) include a roll, a tangent (non-intermeshing) internal mixer (which may be hereinafter referred to as a tangent Banbury mixer) and a twin screw kneader-extruder, and a roll and a tangent Banbury mixer are preferred since rubber in a bulk form is well bitten.

A production method of a wet master batch containing the rubber component and the resin will be described in detail later. The kneader used for producing the wet master batch is preferably a twin screw kneader-extruder capable of performing dehydration-drying and dispersion of the filler to the rubber component simultaneously. A squeezer, a centrifugal dehydration equipment, an expander and a drier may be used in combination.

Wet Master Batch

A production method of a wet master batch containing the rubber component and the resin will be described.

The method preferably contains (a) a step of forming the rubber mixing materials into a liquid form, (a') a step of mixing them, (a") a step of coagulating the mixed liquid, (b) a step of collecting the coagulated product formed in the step (a), and (c) a step of kneading the coagulated product collected in the step (b), with a first kneader, thereby drying and simultaneously dispersing the resin.

Step (a)

In this step, the rubber mixing materials are formed into a rubber liquid in a liquid form.

Examples of the rubber liquid used in the step (a) include natural rubber latex and/or synthetic rubber latex, and an organic solvent solution of synthetic rubber formed through solution polymerization. Among these, natural rubber latex and/or synthetic rubber latex are preferred from the standpoint of the capability and the easiness in production of the resulting wet master batch.

Step (a')

In this step, the liquid rubber material obtained in the step (a) and the resin are mixed.

In the production method of the wet master batch in the embodiment, at least one resin selected from the resins described above is dispersed in the rubber liquid with a homomixer or the like. Specific examples of the method include a method, in which the thermosetting resin in a liquid form is placed in a homomixer, to which the latex is added dropwise under agitation. Specific examples of the method also include a method, in which the thermosetting resin in a liquid form is added dropwise to the latex under agitation. Furthermore, a method, in which the thermosetting resin flow and the latex flow having a certain flow rate ratio are mixed under strong hydraulic agitation conditions, may also be employed.

Step (a")

In this step, the mixed liquid obtained in the mixing step is coagulated. Specifically, the rubber liquid containing the thermosetting resin thus obtained above is coagulated to form a coagulated product. The coagulating method may be an ordinary method.

The ordinary method may be performed in such a manner that a coagulating agent, such as an acid, e.g., formic acid and sulfuric acid, and a salt, e.g., sodium chloride, is added to the liquid, which is then heated or applied with shearing force by agitation or the like. Plural methods may be employed in combination.

Step (b) and Step (c)

In the step (b), the coagulated product formed in the step (a) is collected by a known solid-liquid separation method and sufficiently rinsed. The rinsing method used may be generally a water rinsing method.

In the step (c), the coagulated product, which has been collected and sufficiently rinsed in the step (b), is kneaded with a first kneader under application of a mechanical shearing force, thereby drying the coagulated product and dispersing the filler.

In the step (c), the coagulated product is kneaded and dried under application of a mechanical shearing force with a kneader, and thus the operation is preferably performed continuously from the standpoint of the industrial productivity. An equipment having a single screw may be employed, but a co-rotation or counter-rotation multi-screw kneader-extruder is preferably used, and a twin screw kneader-extruder is particularly preferably used.

Second Step

In this step, the reinforcing filler is kneaded with the master batch obtained in the first step to produce a filled master batch. Specifically, it is preferred that the reinforcing filler is mixed with the master batch (the dry master batch or the wet master batch) with a second kneader.

The second kneader is preferably one selected from an intermeshing internal mixer (which may be hereinafter referred to as an intermeshing Banbury mixer) in which two rotors are engaged with each other, a tangent Banbury mixer, an open roll and a kneader.

Among these, a batch kneader, such as a tangent Banbury mixer and an intermeshing Banbury mixer, is preferred as the second kneader.

A continuous kneader (continuous kneading equipment) represented by a twin screw kneader-extruder undergoes larger fluctuation of the mixed amount per unit volume, as compared to a batch kneader (batch kneading equipment) represented by a Banbury mixer. Accordingly, a batch kneading equipment, such as a Banbury mixer, is preferably employed for dispersing the reinforcing filler uniformly in the rubber composition.

In the second step, the mixing agents other than the crosslinking agent may be added in addition to the reinforcing filler. In this case, the same description as above may also be applied to the first kneader and the second kneader for the wet master batch.

Third Step

In this step, the crosslinking agent is kneaded with the filled master batch obtained in the second step.

Preferred examples of the kneader and the like for kneading may be basically the same as those used in the second step. The second step and the third step may be performed as one step depending on the species of the crosslinking agent used and the kneading conditions.

According to the method for manufacturing a rubber composition of the embodiment thus constituted, the thermosetting resin is added to the rubber component, such as natural rubber, synthetic isoprene rubber and synthetic diene rubber, thereby providing the rubber composition of the embodiment having higher elasticity than the ordinary product and having a high breaking elongation.

Tire

The tire of the embodiment is formed by using the rubber composition. Specifically, the tire of the embodiment contains the rubber composition in any of the tire constitutional members. Examples of the tire constitutional members include a tread, an under tread, a side wall, a carcass coating rubber member, a belt coating rubber member, a bead filler rubber member, a chafer, a bead coating rubber member and a cushion rubber member.

The production of a pneumatic tire with the rubber composition of the embodiment may be performed, for example, in such a manner that a bead filler member or a side reinforcing rubber member for a run flat tire is produced with an extruder or a calender and adhered to other members on a shaping drum to produce a green tire, and the green tire is placed in a tire mold and vulcanized under application of pressure from the inside. The interior of the tire of the embodiment may be filled with nitrogen or an inert gas instead of the air.

Preferred examples of the pneumatic tire include such a pneumatic tire that has a pair of bead members, a carcass in the form of toroid that is connected to the bead members, a belt that hoops the crown portion of the carcass, and a tread. The pneumatic tire of the embodiment may have a radial structure or a bias structure.

The pneumatic tire of the embodiment thus obtained is excellent in reinforcing property, wear resistance and the like, and has a light weight.

The present invention has been described with reference to the embodiments, but the present invention is not limited to the embodiments, and arbitrary modifications and changes may be made therein unless the objects of the present invention are deviated.

EXAMPLE

The embodiment will be described in more detail with reference to examples below, but the embodiment is not limited to the examples. In the following description, "part" means "part by mass", and "%" means "% by mass", unless otherwise indicated.

Production of Resin Composition (Phenolic thermosetting resin)

Resole Type Phenol Resin

In a reactor equipped with an agitation device, a reflux condenser and a thermometer, 1,000 parts of phenol and 1,294 parts of a 37% formaldehyde aqueous solution were added (molar ratio (formaldehyde/phenol)=1.50), to which 5 parts of zinc acetate was further added. The mixture was refluxed for 1 hour, water formed through the reaction was removed under vacuum, and at the time when the temperature reached 90° C., the reaction was further performed for 1 hour, thereby providing 1,145 parts of a resole type phenol resin, which was in a solid state at ordinary temperature (25° C.).

The results of 1H-NMR analysis under the aforementioned conditions of the resulting resole type phenol resin revealed that the dimethylene ether group amount was 45% by mol based on total linking group amount derived from the aldehyde compound.

Novolak Type Resorcin Resin

In a reactor equipped with an agitation device, a reflux condenser and a thermometer, 1,000 parts of resorcin and 3 parts of oxalic acid were added. The reactor was heated until the inner temperature thereof reached 100° C., and after reaching that temperature, 369 parts of a 37% formaldehyde aqueous solution were gradually added over 30 min (molar ratio (formaldehyde/phenol)=0.50). Thereafter, the mixture was refluxed for 1 hour, and water formed through the reaction was removed under normal pressure and removed under vacuum until 170° C., thereby providing 1,040 parts of a novolak type resorcin resin, which was in a solid state at ordinary temperature.

Resin Composition

The novolak type resorcin resin and the resole type phenol resin obtained above were mixed at a mixing mass ratio (novolak type resorcin resin/resole type phenol resin) of 30/70, and pulverized with an impact pulverizer, thereby providing a resin composition (1) in the form of powder.

Production of Master Batch

Natural rubber and various phenolic thermosetting resins were kneaded according to the formulations shown in Table 1 below at 80° C. with an 8-inch open roll, thereby providing dry master batches (1) to (5) (first step).

TABLE 1

|  |  | Master batch (1) | Master batch (2) | Master batch (3) | Master batch (4) | Master batch (5) |
|---|---|---|---|---|---|---|
| Formulation (part by mass) | Natural rubber [1] | 100 | 100 | 100 | 100 | 100 |
|  | Carbon black [2] | — | — | — | — | 50 |
|  | Novolak type phenol resin [3] | 10 | — | — | 55 | 10 |
|  | Novolak type modified phenol resin [4] | — | 10 | — | — | — |
|  | Phenol resin composition [5] | — | — | 10 | — | — |

Note:
[1] natural rubber: RSS#3
[2] carbon black: Asahi #70 (N330), produced by Asahi Carbon Co., Ltd.
[3] novolak type phenol resin: Sumilite Resin PR50235, produced by Sumitomo Bakelite Co., Ltd.
[4] cashew-modified phenol resin: Sumilite Resin PR12686, produced by Sumitomo Bakelite Co., Ltd.
[5] phenol resin composition: resin composition (1) obtained in production of resin composition

Example 1

The components shown in Table 2 below other than zinc flower, a vulcanization accelerator and sulfur were kneaded with the master batch (1) obtained in the first step with a Banbury mixer, thereby providing a filled master batch (second step). Zinc flower, a vulcanization accelerator and sulfur were then added and kneaded with the filled master batch with an 8-inch open roll, thereby providing an unvulcanized rubber composition (third step). The rubber composition was then formed into a sheet having a thickness of 2 mm and then vulcanized at 145° C. for 30 minutes. The resulting vulcanized rubber was evaluated for various characteristics according to the following methods.

(1) Breaking Elongation and Breaking Strength

The resulting vulcanized rubber was punched out to the shape of JIS dumbbell No. 3 to prepare a specimen, which was subjected to a tensile test at 25° C. according to JIS K6251 to measure the breaking elongation and the breaking strength. The results are shown in Table 2.

(2) Dynamic Viscoelasticity E'

The resulting vulcanized rubber was measured for resulting dynamic viscoelasticity E' with a spectrometer, produced by Toyo Seiki Seisaku-Sho, Ltd., at an initial load of 100 g, a strain of 2%, a measuring frequency of 50 Hz and a measuring temperature of 60° C. The results are shown in Table 2.

Examples 2 to 4

Vulcanized rubber was produced in the same manner as in Example 1 except that the master batches (2), (3) and (4) were used, and the formulations shown in Table 2 were used as the rubber compositions, and evaluated in the same manner.
The results are shown in Table 2.

Comparative Examples 1 to 3 and Comparative Example 4

In Comparative Examples 1 to 3, vulcanized rubber was produced in the same manner as in Example 1 except that the natural rubber and the phenol resin was mixed in the second step without performing the first step, and evaluated in the same manner.

In Comparative Example 4, the master batch (5) containing carbon black was prepared in the first step. Vulcanized rubber was produced in the same manner as in Example 1 except that the master batch (5) was used, and the formulation shown in Table 2 was used as the rubber compositions, and evaluated in the same manner.

The results are shown in Table 2.

TABLE 2

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Formulation (part by mass) | Master batch (1) | 110 | — | — | — | — | — | — | — |
|  | Master batch (2) | — | 110 | — | — | — | — | — | — |
|  | Master batch (3) | — | — | 110 | — | — | — | — | — |
|  | Master batch (4) | — | — | — | 155 | — | — | — | — |
|  | Master batch (5) | — | — | — | — | — | — | — | 160 |
|  | Natural rubber [1] | — | — | — | — | 100 | 100 | 100 | — |
|  | Novolak type phenol resin [2] | — | — | — | — | 10 | — | — | — |
|  | Novolak type modified phenol resin [3] | — | — | — | — | — | 10 | — | — |
|  | Phenol resin composition [4] | — | — | — | — | — | — | 10 | — |
|  | Carbon black [5] | 50 | 50 | 50 | 50 | 50 | 50 | 50 | — |
|  | Stearic acid | 2 | 2 | 2 | 2 | 2 | 2 | 2 | 2 |
|  | Antiaging agent [6] | 1 | 1 | 1 | 1 | 1 | 1 | 1 | 1 |
|  | Zinc flower | 4 | 4 | 4 | 4 | 4 | 4 | 4 | 4 |
|  | Hexannethoxymethyl-melamine [7] | 5 | 5 | — | 5 | 5 | 5 | 5 | 5 |
|  | Vulcanization accelerator [8] | 2 | 2 | 2 | 2 | 2 | 2 | 2 | 2 |
|  | Sulfur [9] | 5 | 5 | 5 | 5 | 5 | 5 | 5 | 5 |

TABLE 2-continued

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Evaluation | Breaking elongation (%) | 202 | 204 | 202 | 150 | 192 | 196 | 200 | 205 |
|  | Breaking strength (MPa) | 15.2 | 15.4 | 16.2 | 18.3 | 14.6 | 14.2 | 15.0 | 15.0 |
|  | Dynamic Viscoelasticity E' (MPa) 60° C. | 30.4 | 38.2 | 32.5 | 52.0 | 19.1 | 25.3 | 18.3 | 24.5 |

Note:
[1] natural rubber: RSS#3
[2] novolak type phenol resin: Sumilite Resin PR50235, produced by Sumitomo Bakelite Co., Ltd.
[3] cashew-modified phenol resin: Sumilite Resin PR12686, produced by Sumitomo Bakelite Co., Ltd.
[4] phenol resin composition: resin composition (1) obtained in production of resin composition
[5] carbon black: Asahi #70 (N330), produced by Asahi Carbon Co., Ltd.
[6] antiaging agent: Nocrac 6C, a trade name, produced by Ouchi Shinko Chemical Industrial Co., Ltd., N-(1,3-dimethylbutyl)-N'-phenyl-p-phenylenediamine
[7] Cyrez 964RPC, a trade name, produced by Cytec Industries Inc.
[8] vulcanization accelerator: Nocceler CZ, a trade name, produced by Ouchi Shinko Chemical Industrial Co., Ltd., N-cyclohexyl-2-benzothiazolylsulfenamide
[9] sulfur: Crystex HS OT 10, a trade name, produced by Flexsys Inc.

As apparent from the results shown in Table 2, it is understood that the compositions of Examples, which are produced by using the master batch that has been kneaded with the phenolic thermosetting resin in advance, are enhanced in dynamic viscoelasticity E' and have a large breaking elongation, as compared to the rubber compositions of Comparative Examples 1 to 3, which are produced without performing the first step, i.e., without the use of the master batch.

It is further understood that Comparative Example 4, in which carbon black was mixed in the first step, is good in breaking elongation but is insufficient in dynamic viscoelasticity E'. It is understood therefrom that the reinforcing filler, such as carbon black, is preferably mixed in the second step rather than in the first step.

The invention claimed is:

1. A method for manufacturing a rubber composition containing
a rubber component,
a resin,
a curing agent for the resin,
a reinforcing filler and
a crosslinking agent,
the method comprising: a first step of adding the resin to the rubber component to produce a master batch; a second step of kneading the master batch with the reinforcing filler to produce a filled master batch; and a third step of kneading the filled master batch with the crosslinking agent and the curing agent for the resin,
wherein the resin consists of a phenolic thermosetting resin, and
wherein the rubber component is at least one selected from natural rubber, styrene-butadiene copolymer rubber and polybutadiene rubber.

2. The method for manufacturing a rubber composition according to claim 1, wherein the first step is a step of producing a dry master batch.

3. The method for manufacturing a rubber composition according to claim 1, wherein the phenolic thermosetting resin is at least one selected from a novolak type phenol resin, a novolak type cresol resin, a novolak type xylenol resin, a novolak type resorcinol resin, resins formed by modifying these resins with an oil, and a resin composition containing a novolak type resorcin resin and a resole type phenol resin.

4. The method for manufacturing a rubber composition according to claim 1, wherein the phenolic thermosetting resin contains a methylene donor in an amount of from 0.1 to 80% by mass based on the total amount of the phenolic thermosetting resin.

5. The method for manufacturing a rubber composition according to claim 3, wherein the novolak type resorcin resin is obtained by reacting resorcin and an aldehyde compound at a molar ratio (aldehyde compound/resorcin) of from 0.4 to 0.8.

6. The method for manufacturing a rubber composition according to claim 3, wherein the resole type phenol resin has a dimethylene ether group amount of from 20 to 80% by mol based on a total linking group amount derived from an aldehyde compound that links aromatic rings derived from a phenolic compound.

7. The method for manufacturing a rubber composition according to claim 3, wherein the oil used for modifying the resin is at least one oil selected from rosin oil, tall oil, cashew oil, linoleic acid, oleic acid and linolenic acid.

8. The method for manufacturing a rubber composition according to claim 1, wherein an amount of the resin mixed is from 2 to 50 parts by mass per 100 parts by mass of the rubber component.

9. The method for manufacturing a rubber composition according to claim 1, wherein an amount of reinforcing filler mixed is from 5 to 200 parts by mass per 100 parts by mass of the rubber component.

10. A rubber composition produced by the method for manufacturing a rubber composition according to claim 1.

11. A tire produced using the rubber composition according to claim 10.

* * * * *